(12) United States Patent
Wilson, Jr.

(10) Patent No.: US 7,736,131 B1
(45) Date of Patent: Jun. 15, 2010

(54) TURBINE BLADE WITH CARBON NANOTUBE SHELL

(75) Inventor: Jack W Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 138 days.

(21) Appl. No.: 12/244,368

(22) Filed: Oct. 2, 2008

Related U.S. Application Data

(63) Continuation-in-part of application No. 12/176,930, filed on Jul. 21, 2008, now abandoned.

(51) Int. Cl.
  *F01D 5/14* (2006.01)
(52) U.S. Cl. .................. 416/226; 416/230; 416/232; 416/239; 416/241 R
(58) Field of Classification Search ............. 416/226, 416/230, 232, 239, 240, 241 R
See application file for complete search history.

(56) References Cited

U.S. PATENT DOCUMENTS

| | | | |
|---|---|---|---|
| 7,052,234 B2 * | 5/2006 | Wells et al. | 415/137 |
| 7,306,828 B2 * | 12/2007 | Barrera et al. | 416/241 B |
| 7,329,087 B2 * | 2/2008 | Cairo et al. | 415/135 |
| 7,521,105 B2 * | 4/2009 | Bech et al. | 416/229 R |

* cited by examiner

*Primary Examiner*—Igor Kershteyn
(74) *Attorney, Agent, or Firm*—John Ryznic

(57) ABSTRACT

A turbine blade for use in a gas turbine engine, where the turbine blade is made from a spar and shell construction in which a thin walled shell is formed from carbon or molybdenum nanotubes arranged in a direction such that the nanotubes are under tension when the blade is rotating in the engine. The carbon nanotubes are allotropes of carbon in which the length to diameter ratio exceeds 1,000,000 in order to produce very high tensile strength, unique electrical properties, and a very efficient conductor of heat. The nanotube shell includes a metal insert having a tear drop shape and the lower end of the shell wraps around the metal insert to form a wedge in which the shell is held in place against radial displacement between the platform and the attachment portion of the blade.

17 Claims, 6 Drawing Sheets

TURBINE BLADE WITH CARBON NANOTUBE SHELL

CROSS-REFERENCE TO RELATED APPLICATIONS

This application claims the benefit to an earlier filed and co-pending U.S. patent application Ser. No. 12/176,930 filed on Jul. 21, 2008 and entitled TURBINE BLADE WITH CARBON NANOTUBE SHELL.

FEDERAL RESEARCH STATEMENT

None.

BACKGROUND OF THE INVENTION

1. Field of the Invention

The present invention relates generally to a gas turbine engine, and more specifically to a turbine blade formed from a spar and shell.

2. Description of the Related Art Including Information Disclosed under 37CFR 1.97 and 1.98

In a gas turbine engine, a compressed air from a compressor is burned with a fuel in a combustor to produce a hot gas flow. The hot gas flow is passed through a multiple stage turbine to convert most of the energy from the gal flow into mechanical work to drive the compressor, and in the case of an aero engine to drive a fan, and in the case of an industrial gas turbine (IGT) engine to drive an electric generator to produce electrical power.

The efficiency of the engine can be increased by passing a higher temperature gas into the turbine, or a higher turbine inlet temperature. However, the maximum turbine inlet temperature will depend upon the material properties of the first stage turbine stator vanes and rotor blades, since these airfoils are exposed to the highest gas flow temperature. Modern engine has a turbine inlet temperature around 2,400 degrees F., which is much higher than the melting point of a typical modern vane or blade. These airfoils can be used under these high temperature conditions due to airfoil cooling using a mixture of convection cooling along with impingement cooling and film cooling of the internal and the external surfaces of these airfoils.

A few very high temperature materials exist that have melting points well above modern engine turbine inlet temperatures. Columbian has a melt temperature of up to 4,440 F; TZM Moly up to 4,750 F; hot pressed silicon nitride up to 3,500 F; Tantalum up to 5,400 F; and Tungsten up to 6,150 F these materials would allow for higher turbine inlet temperatures. However, these materials cannot be cast or machined to form turbine airfoils.

On prior art method of forming a turbine airfoil from one of these exotic high temperature materials is disclosed in U.S. Pat. No. 7,080,971 B2 issued to Wilson et al on Jul. 25, 2006 and entitled COOLED TURBINE SPAR SHELL BLADE CONSTRUCTION, the entire disclosure being incorporated herein by reference. The shell is formed from a wire EDM process to form a thin walled airfoil shell, and the shell is held in compression between a spar tip and the blade platform or root section. The shell can take the higher gas flow temperatures, and the spar provides internal cooling for the airfoil walls.

It is well recognized that forming a steel wire with a long length/diameter ratio will improve its tensile strength compared to a standard forging. Carbon nanotubes (CNTs) are allotropes of carbon. This results in a nanostructure where the length/diameter ratio exceeds 1,000,000. Such cylindrical carbon molecules have novel properties that make them potentially useful in many applications in nanotechnology, electronics, optics and other fields of materials science. CNTs exhibit extraordinary strength and unique electrical properties, and are efficient conductors of heat. Inorganic nanotubes have also been synthesized.

All nanotubes are expected to be very good thermal conductors along the tube, exhibiting a property known as ballistic conduction, but good insulators laterally to the tube axis. It is predicted that carbon nanotubes will be able to transmit up to 6,000 watts per meter per degree Kelvin at room temperature compared to copper—a metal well known for its good thermal conductivity—which only transmits 385 W/(m*K). The temperature stability of carbon nanotubes is estimated to be up to 2,800 degrees Celsius in vacuum and about 750 degrees Celsius in air.

BRIEF SUMMARY OF THE INVENTION

It is an object of the present invention to provide for a turbine airfoil with a very long life prediction for the shell.

It is another object of the present invention to provide for a shell formed from a nanotube material.

It is another object of the present invention to provide for a spar and shell turbine blade in which the shell made from a nanotubes material that is supported in tension to increase the life of the blade.

It is another object of the present invention to provide for a spar and shell turbine blade with a thermally free platform to relieve thermal fight.

It is another object of the present invention to provide for a spar and shell turbine blade which eliminates bonds, welds and brazes.

It is another object of the present invention to provide for a spar and shell turbine blade with a much lighter weight.

A turbine blade made from a spar and shell construction in which the spar is connected to the attachment section of the blade by only a mechanical fastener without bonds, welds or brazing. The shell is formed from Carbon or Molybdenum nanotubes extending in the spanwise direction of the shell and held in tension during rotation of the blade to provide for an infinite life. The shell is constructed of a single piece with the nanotubes running in the airfoil spanwise direction. The lower end of the shell includes a tear drop shaped metal insert in order to wedge the shell in place between a separate platform and the root or attachment portion of the blade. The lower end of the nanotube shell wraps around the tear drop shaped metal insert. The platform includes an inner top surface that slants inward toward the attachment portion in order to pinch the shell between the platform and the attachment and thus hold the shell against radial outward displacement during rotation of the blade.

The shell is held in place on the lower end and is free to slide radially at the tip end. The platform is a separate piece from the attachment portion in order to provide for a thermally free platform to relieve the thermal fight between the platform and the airfoil portion. The shell can be held in tension so that an infinite life for the blade can be obtained. A tie bolt is used to fasten the spar to the attachment or root portion of the blade, and the attachment includes a cavity and an opening on the bottom in which a hex nut and be inserted onto the tie bolt and a tool inserted to tighten the tie bolt and secure the spar to the attachment or root portion of the blade.

DETAILED DESCRIPTION OF THE INVENTION

Figure 1:
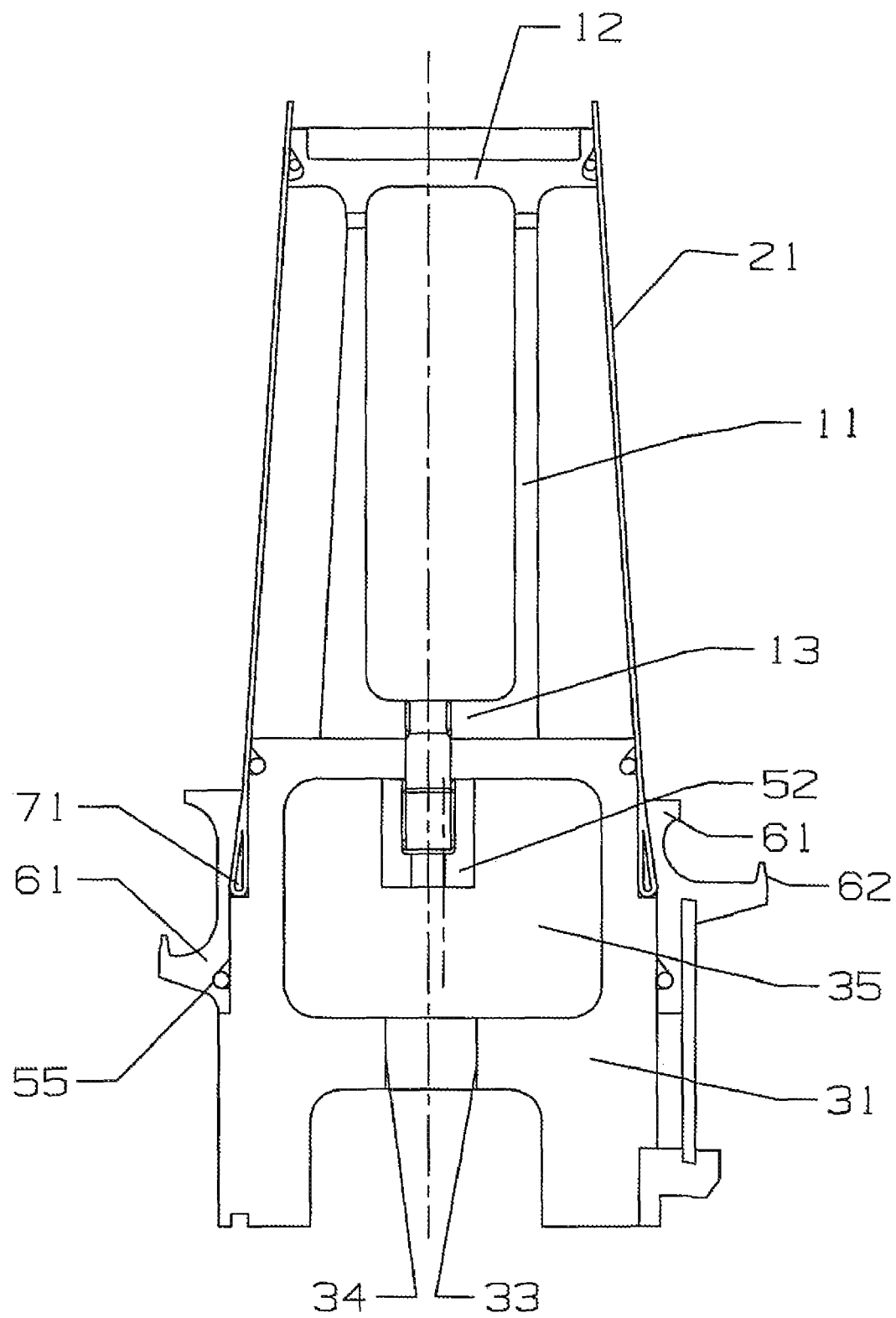
FIG. 1 is a pressure side view of a cross section of the turbine blade of the present invention.

The present invention is a turbine blade with a spar and shell construction that reduces or eliminates the problems discussed above in the background. The blade 10 is shown in FIG. 1 and includes a spar 11 with a tip end 12 and a platform end 13, a shell 21 made from high temperature resistant Carbon or Molybdenum nanotubes extending along the spanwise direction of the shell and under tension, and an attachment or root 31 section in which the spar 11 fastened. The attachment 31 can be a single piece or made from several pieces secured together to form the root of the blade with a rotor disk attachment such as a fir tree configuration, and a platform to form a seal with adjacent airfoils in the turbine. A platform section 61 with fingers 62 that form part of a labyrinth seal is mounted onto the attachment 31 and forms the platform for the blade. In the FIG. 1 embodiment, the tip 12 and the spar 11 are a single piece. However, in another embodiment the tip that forms the blade tip can be formed as a separate piece from the spar and secured to the spar by any well known means such as bonding, welding or brazing or a mechanical fastener. In another embodiment, the attachment 31 and the platform 61 can be formed as a single piece instead of separate pieces as shown in FIG. 1. Also, the spar 11 and the attachment 31 can be formed as a single piece since the shell is not held in compression by the blade tip portion of the spar in the present invention. The spar can be cast for ease of manufacture since the shell 21 is separate from the spar 11.

Figure 6:
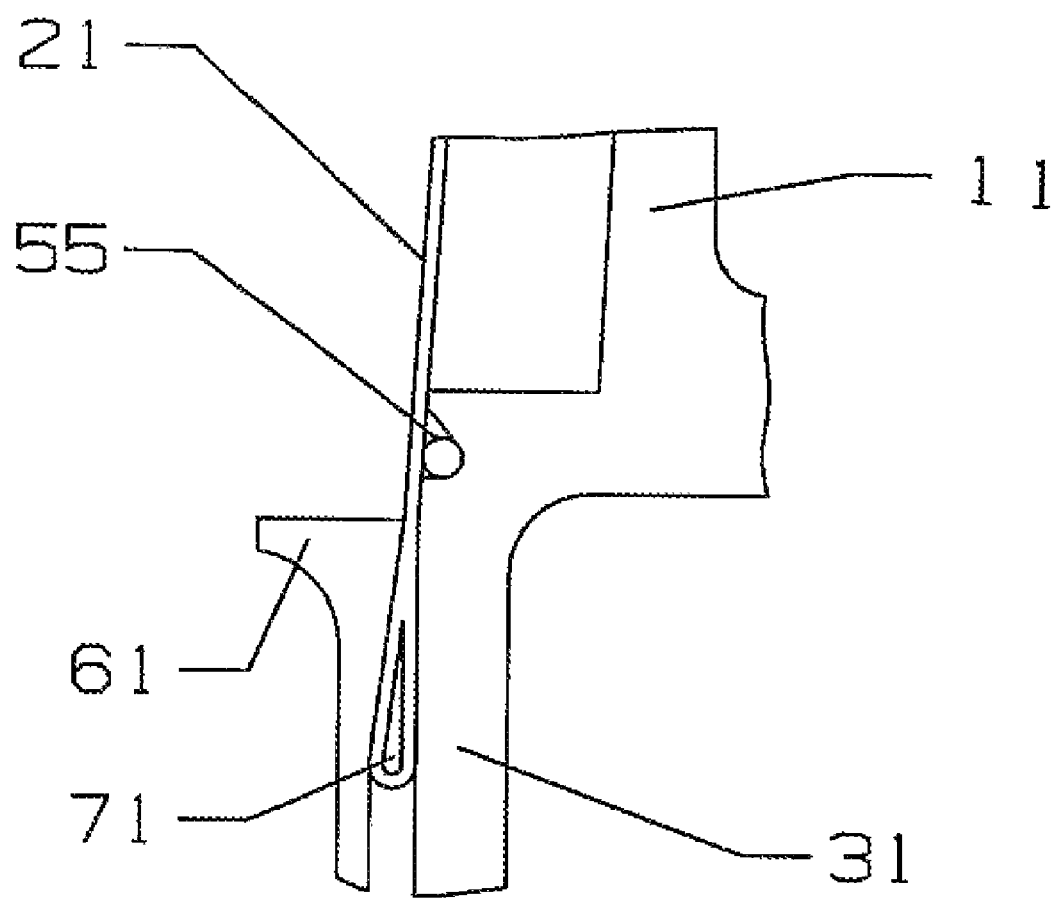
FIG. 6 is a detailed view of the connection between the lower end of the shell and the platform and attachment interface.

The shell 21 is made from a carbon or molybdenum nanotube material in which the nanotubes extend substantially along the spanwise direction of the airfoil such that the nanotubes are under tension during rotation of the blade. The shell 21 is a thin walled surface that forms the airfoil portion of the blade and includes the leading edge and the trailing edge, and the pressure side and the suction side walls. The shell 21 thickness about 0.060 inches. The nanotube shell has an 80% taper. The shell 21 is held in tension during engine operation by a dear drop shaped metal insert 71 as seen in FIG. 6. The nanotube shell wraps around the metal insert 71 on the lower end of the shell. The platform 61 includes a slanted inner surface on the upper end and the attachment or root portion 31 includes a slanted outward surface on the outer end adjacent to the platform slanted surface so that the metal insert and the shell can be wedged between the two slanted surfaces when the shell is in place between the platform 61 and the attachment 31.

Figure 2:
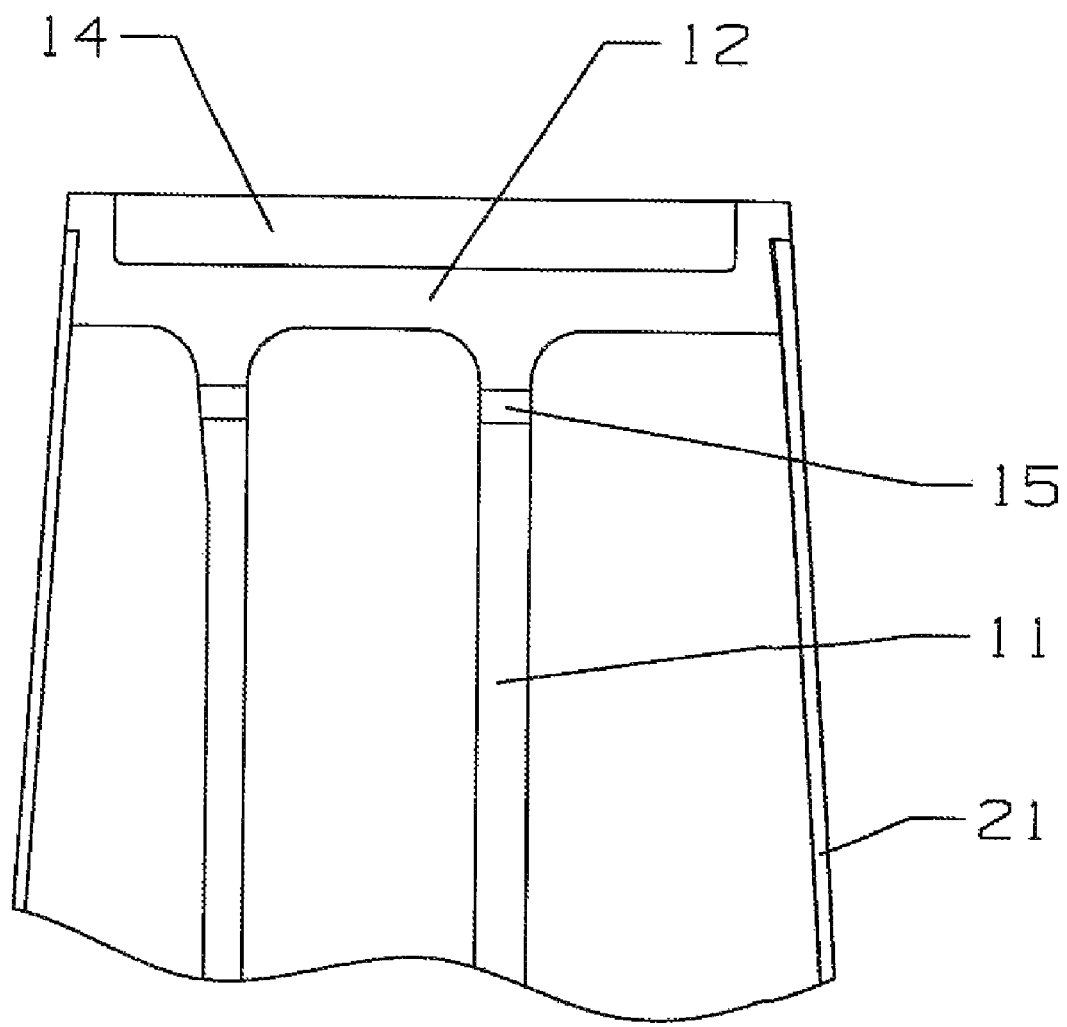
FIG. 2 is a detailed view of the tip of the blade in FIG. 1.

The spar 11 includes a tip section 12 as seen in more detail in FIG. 2. The tip 12 includes a squealer tip 14 formed by the tip walls around the airfoil surfaces, cooling holes 15 on the tip and the side of the spar 11 to provide cooling for the squealer tip and the backside surface of the shell 21. The outside edges of the tip 12 also includes a seal groove with an upper groove surface slanted so that a wire seal 56 placed within the groove will be forced upward and thus outward and against the inner surface of the shell to provide for a tight fitting seal when the blade is rotating. The lower end of the spar 13 includes a threaded hole about in the center in which a tie bolt screws into in order to pull the spar 11 against the upper surface of the platform 31 and secure the shell 21 in-between the spar tip 12 and the platform 31. The spar and the platform can be cast or machined, and can be made from different materials. The shell and the spar are placed in tension when the blade is rotating. The shell can extend outward beyond the end of the tip or can be flush with the tip.

Figure 3:
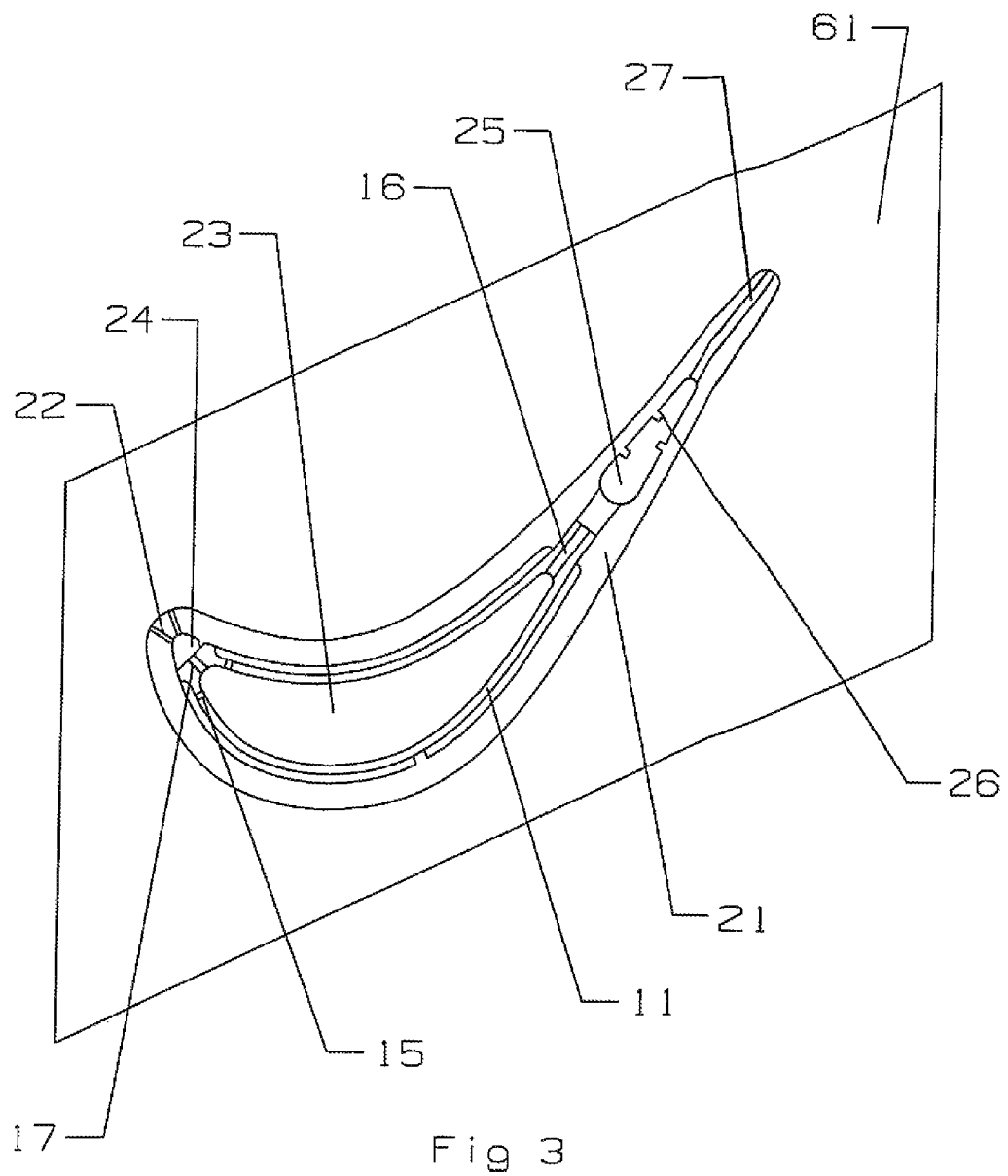
FIG. 3 shows a top view of a cross section of the spar and shell and the platform of the blade of FIG. 1.

FIG. 3 shows a top view of a cross section through the blade which shows the platform outer surface and the cooling passages formed within the spar and the shell assembly. The platform 31 is standard in shape. The spar 11 includes a leading edge with a row of metering and impingement holes 17 and two rows of impingement holes 15 one on the pressure side and the second on the suction side. The spar 11 forms a cooling air supply cavity 23 and has a row of exit cooling holes 16 on the trailing edge side of the spar 11. The shell 21 includes a leading edge with a showerhead arrangement of film holes 22. A leading edge impingement cavity 24 is formed between the spar and the shell. The trailing edge region of the shell includes a trailing edge cavity 25 with a plurality of trip strips 26 spaced along the side walls in an alternating arrangement to act as turbulent promoters for the cooling air. A row of trailing edge exit holes 27 is formed along the trailing edge of the shell 21. The spar and shell form a pressure side impingement cavity and a suction side impingement cavity between the metering hole 17 and the exit hole 16. Impingement holes 15 formed on the spar 11 force pressurized cooling air from the cavity 23 to impinge against the inner side walls of the shell to provide impingement cooling. Cooling air from the cavity 23 also flows through the exit holes 16, then through the trailing edge cavity 25 and out the exit holes 27 to provide cooling for the trailing edge region.

Ribs can also be used to prevent bulging of the airfoil wall. The ribs can formed on the inner surface of the shell and extend inward to abut the spar, or the ribs can be formed on the spar and extend outward and abut against the shell. In one embodiment, one rib formed on the shell extends inward and abuts against the spar at about a midpoint within the suction side impingement cavity as seen in FIG. 3. One or more ribs can be included on the pressure side of the airfoil to provide support for the shell 21 against the spar 11.

Figure 4:
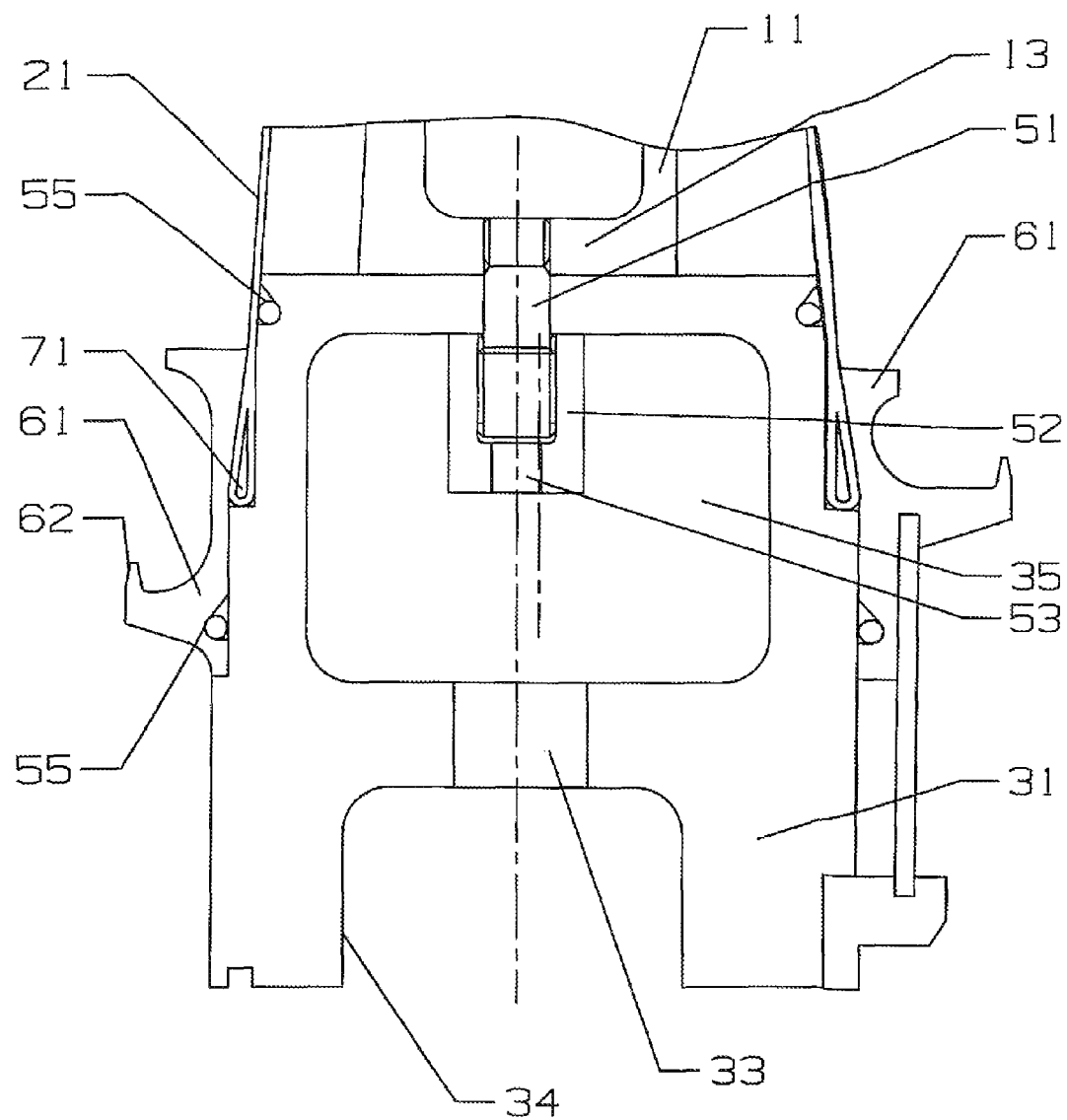
FIG. 4 shows a detailed side view of the spar to root attachment connection of the blade of FIG. 1.
Figure 5:
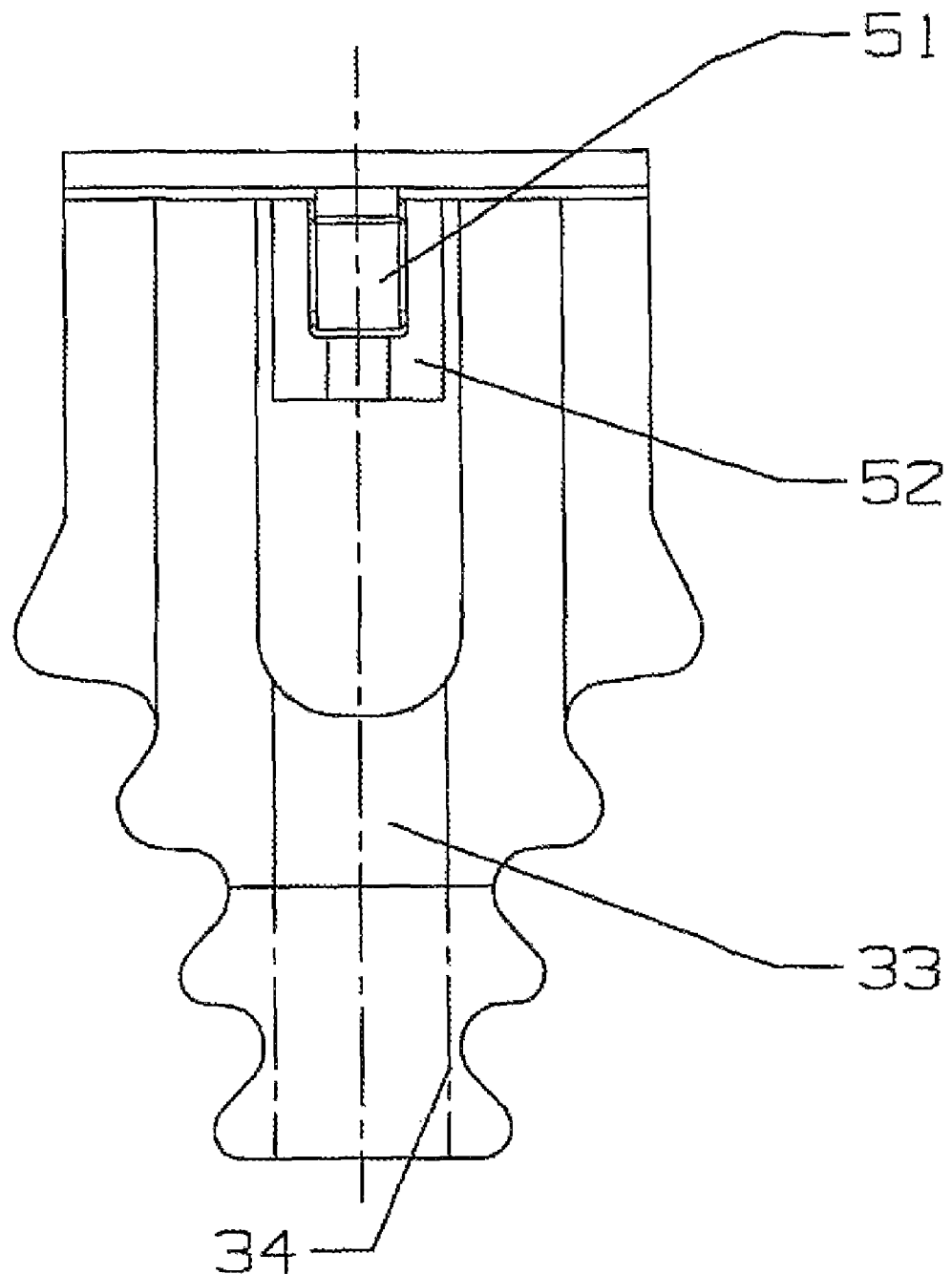
FIG. 5 shows a detailed front view of the lower part of the attachment connection of FIG. 4.

FIG. 4 shows a detailed view of the tie bolt and spar to attachment connection. The spar 11 includes a threaded hole on the bottom end 13 in which the tie bolt 51 screws into. The attachment 31 includes an inner cavity 35 and a top surface with a hole for insertion of the tie bolt 51. The lower end of the tie bolt 51 also includes threads on the outer surface in which an Allen nut 52 screws onto. The Allen nut 52 includes a hex shaped opening on the bottom in which a wrench or other tool is inserted into and screw the Allen nut onto the threaded bottom portion of the tie bold 51. A self locking nut 64 is threaded onto the tie bolt to lock the Allen nut 52 in place. The attachment 31 includes a slot 34 on the bottom and an opening 33 on the top surface of the slot 34 for insertion of the Allen nut, the self locking nut 64 and the wrench to remove or secure the Allen nut 52 and the self locking nut 64 to the tie bolt 51. FIG. 5 shows a front view of the tie bolt and spar and shell interface when assembled. The tie bolt 51 is made from MP159 for resistance to the high temperature environment of the platform and the attachment, has a diameter of 0.750 inches, and includes 16 threads. However, other diameters and thread numbers are possible in order to retain the spar 11 to the attachment 31. The tie bolt 51 must be capable of withstanding very high stress levels in order to secure the shell 11 between the spar tip and the platform 61 during engine operation. One or more tie bolts 51 can be used to secure the spar to the shell.

The shell 21 is secured to the spar 11 and attachment 31 in a thermally free manner by allowing for a space to exist between the bottom of the shell 21 and the top surface of the attachment 31. As seen in FIG. 1, a lower wire seal 55 is held within an inward facing groove formed in the platform 61 with a slanted upper surface. The wire seal 55 is forced upward from the centrifugal force developed during rotation of the blade. This forces the wire seal 55 up against the attachment 31 surface and the upper groove surface to form a tight fitting seal. A second or upper wire seal 56 is placed within an outward facing groove formed on the blade tip 12 as seen in FIGS. 1 and 2. The top of the groove is also slanted upward so that the upper wire seal 56 is forced upward and against the inner surface of the shell 21 to produce a tight fitting seal under rotation of the blade.

Because the shell 21 is held under tension during engine operation and because the nanotubes are much stronger under tension than under compression, an infinite life for the shell is predicted. A life of from 5 to 25 times longer than the prior art blades is predicted. Thus, the turbine blade with the spar and shell construction of the present invention can be used in an engine, such as an industrial gas turbine engine, for long periods without repair or replacement.

Another benefit from the turbine blade with the spar and shell construction of the present invention is the weight savings over the prior art blade. A large IGT engine used for power production includes 72 blades in the first stage of the turbine, and each blade weighs 14.7 pounds including the TBC. The blade of the present invention weighs 10.9 pounds which is almost 4 pounds less than the prior art. A lighter blade will produce a lower stresses on the rotor disk due to the lower centrifugal forces developed than in the prior art blade. Lower stress on the rotor disk will allow for smaller and lower weight rotor disks, or improved disk LCF life at the life limiting location.

The process for assembling the turbine blade is described next. The nanotube shell with the metal insert is assembled. The tip is secured to the spar if separate pieces are used. The spar with the tip secured on the end is fastened to the attachment 31. The spar and attachment 31 assembly is then placed inside the shell from the lower end of the shell so that the lower end of the shell will abut against the slanted outward surfaces of the attachment 31. The platform 61 is then placed over the shell and secured to the attachment such that the slanted inward facing surfaces of the platform wedge the metal insert in place between the two slanted surfaces. The tie bolt is tightened and the self locking nut is secured to prevent the tie bolt from loosening.

Another feature of the spar and shell turbine blade of the present invention is the reduction in the casting technology used to form the blade. A lower level of casting technology allows for alternative casting vendors to be used to manufacture the blade. The present invention provides approximately 30% reduction is size of casting footprint. Casting costs are a function of parts per mold and casting yield. Removing the platform would allow more parts per mold for airfoil spar and increased yield. Separate platform would permit (if cast) cored platforms and other high technology features to be used.

I claim the following:

1. A turbine blade for use in a gas turbine engine, the turbine blade comprising:
   an attachment portion;
   a spar extending outward from the attachment portion;
   a shell secured to the attachment portion; and,
   the shell being formed from nanotubes extending substantially in the spanwise direction of the blade.

2. The turbine blade of claim 1, and further comprising:
   the shell includes a lower end having a tear drop cross sectional shape; and,
   the attachment portion having a slanted outward facing surface on the upper end that forms a surface to secure the shell against radial displacement with respect to the attachment portion.

3. The turbine blade of claim 2, and further comprising:
   a platform portion separate from the attachment portion, the platform portion having a slanted inward facing surface on the upper end; and,
   the slanted surfaces on the attachment portion and the platform function to wedge the lower end of the shell between the slanted surfaces.

4. The turbine blade of claim 1, and further comprising:
   a platform in portion formed as a separate piece from the attachment portion, the platform portion having a slanted inward facing surface on the upper end forms a surface to secure the shell against radial displacement with respect to the attachment portion.

5. The turbine blade of claim 1, and further comprising:
   the shell includes a lower end with a tear drop cross sectional shape.

6. The turbine blade of claim 1, and further comprising:
   the spar includes a tip portion;
   the tip portion includes an outward facing seal groove; and,
   the shell extends above the tip seal groove such that a seal within the tip groove would produce a seal between the tip and the shell.

7. The turbine blade of claim 1, and further comprising:
   the shell is formed from carbon nanotubes or molybdenum nanotubes.

8. The turbine blade of claim 1, and further comprising:
   the nanotubes are allotropes of carbon such that the length to diameter ratio is greater than 1,000,000.

9. The turbine blade of claim 1, and further comprising:
   the shell has a nominal thickness of around 0.060 inches.

10. The turbine blade of claim 9, and further comprising:
    the shell has a taper of around 80%.

11. The turbine blade of claim 1, and further comprising:
    the shell is secured to the attachment portion under tension when the blade is rotating in the gas turbine engine.

12. A shell for use in a spar and shell turbine blade which is used in a gas turbine engine, the shell comprising:
    the shell being formed from nanotubes;
    a metal insert having a tear drop shape; and,
    the lower end of the shell wrapping around the metal insert to form a wedge surface to secure the shell to an attachment portion of the spar and shell blade assembly.

13. The shell of claim 12, and further comprising:
    the nanotubes are Caron nanotubes or Molybdenum nanotubes.

14. The shell of claim 12, and further comprising:
the nanotubes are arranged such that the nanotubes are under tension when the blade is rotating within the engine.

15. The shell of claim 12, and further comprising:
the nanotubes are allotropes of carbon such that the length to diameter ratio is greater than 1,000,000.

16. The shell of claim 12, and further comprising:
the shell has a nominal thickness of around 0.060 inches.

17. The shell of claim 16, and further comprising:
the shell has a taper of around 80%.

* * * * *